Patented Feb. 15, 1938

2,108,673

UNITED STATES PATENT OFFICE 2,108,673

MANUFACTURE OF RUBBER AND RUBBER-LIKE ARTICLES

Walter Kay, Bury, England, assignor to Kaysam Corporation of America, Dover, Del., a corporation of Delaware No Drawing. Original application November 1, 1932, Serial No. 640,650. Divided and this application July 6, 1935, Serial No. 30,169. Renewed June 2, 1937. In Great Britain November 5, 1931

3 Claims. (Cl. 18—50)

The invention of this application (a division of my copending application Serial No. 640,650, filed November 1, 1932) relates to rubber or rubber-like compositions and to articles manufactured therefrom. The invention is particularly applicable to the manufacture of such articles as rubber soles and heels, rubber bathing shoes, rubber boots and shoes of all kinds and rubber balls, rubber flooring such as tiles and mats and motor car running boards, and in fact, to molded rubber goods in general, hollow or not.

One object of the invention is to provide an improved method of forming a sensitive mix containing rubber latex capable of setting or gelling without synaeresis. Another object is to provide means for controlling the time of setting or gelling of such a mix. Yet another object is to provide a method whereby articles having parts differing widely in thickness may be manufactured from a sensitive latex mix.

In proceeding in accordance with the present invention a stable mix is formed from an aqueous dispersion of natural or synthetic rubber with or without one or more fillers, vulcanizing agents or other ingredients, and with or without added water, preferably in such a way that the mix has a total dry residue content of more than 60%. This mix is then rendered unstable by the addition of a setting agent. It is to be understood that the initial mix is stable in that it can be kept under the same conditions as the dispersion itself without coagulation or setting taking place, that is to say it can be kept at any ordinary temperature for an almost indefinite period. When, however, the setting agent is added, the resultant mixture promptly becomes unstable, that is to say, it can no longer be kept indefinitely, but if poured into an open shallow mold, for example, it will set completely and irreversibly in a longer or shorter time according to its composition and the temperature. An important feature of the invention consists, therefore, in pouring the resultant mixture into a mold immediately or almost immediately after the addition of the setting agent. If desired, the mold may then be heated to cause the mixture to set. The mixture may be kept for a few minutes before it is poured into the molds, but at the ordinary temperature of the work-room in which the heating of the molds is taking place the initial thickening or setting of the mixture begins straight away and in general the mixture should not be kept for more than ten minutes before it is poured into the molds.

The term "aqueous dispersion of natural or synthetic rubber" is intended to include rubber latex, whether concentrated or not and either natural or preserved or vulcanized or even pre-agglomerated, or an aqueous dispersion of crude or vulcanized rubber (either reclaimed or virgin), an aqueous dispersion manufactured by chemical synthesis from such substances as isoprene, butadiene or their homologues, and other like dispersions.

The quicker the actual setting, the better the results, and it is one great advantage of the process according to the invention that a very quick setting agent, or a relatively large quantity of a setting agent, may be used without risk or premature setting. The better results of quick setting are due to two causes; on the one hand slow setting leads to the formation of a coarse and soft product, and on the other hand there is some tendency for the powders in the mixture to settle out, so that the product is less homogeneous if the setting is slow. Furthermore, speed in setting means that the formed bodies can be removed from the molds quickly and thus the amount of apparatus for a given output can be reduced. It is, therefore, desirable either to use a very quick setting agent or to use a relatively high proportion of the setting agent. In conjunction with this it is desirable to use a highly concentrated dispersion having a dry residue content of about 70% or more, such for example as the concentrated rubber latex sold under the registered trade-mark "Revertex." As is well known "Revertex" differs from other latices in that the preservative by which it is kept unchanged is a non-volatile alkali and not ammonia and that it contains all the non-rubber serum solids originally present in the natural latex. In such a highly concentrated dispersion the rubber particles are very close together and, therefore, when the setting is quick a very good tough product is obtained. The use of a highly concentrated latex also affords the great advantage that, prior to the step of being worked into the latex, the various ingredients can be dissolved or suspended in adequate quantities of water for the mixing to take place easily without the proportion of the dry residue to the whole being reduced to such an extent that the final rubber product when set would not be sufficiently uniform for practical purposes. On the other hand, it has been found that with the use, for example, of an unconcentrated latex or a latex of lower concentration, the added ingredients have either to be added dry or wetted with relatively small quantities of water, in which case there is a considerable tendency for coagulation to take place at least locally, or they must be added in such quantities of water as to render the whole mix so fluid that the final product is insufficiently tough.

With the use of an unconcentrated latex or a latex of concentration less than 60%, it is desirable and often necessary to use a thickening agent such as gum karaya solution or sodium salicylate, so as to obtain satisfactory viscosity and to prevent settling out of the powder. The term "coagulation" is used in this specification in its normal sense of involving practically immediate separation of the serum from the rubber, i. e. synaeresis, which separation does not take place in the setting according to the invention.

Extensive researches have shown that the setting agent may vary in its composition to a very substantial extent. The setting appears to be due to a change in the charge of the rubber particles of the latex, which are normally negatively charged, i. e. are anodic, but which become positively charged through the addition of the setting agent. The essential characteristic which a setting agent must possess, therefore, is a capacity for providing an adequate quantity of positively charged ions. While a number of examples of suitable setting agents is given below, the invention is not limited to these, and the suitability of any substance or mixture of substances can easily be ascertained by a simple test made upon the dispersion in question which need not for this purpose be compounded at all.

Examples of setting agents which may be used are ammonium salts, such as ammonium chloride, ammonium nitrate, ammonium carbonate, and ammonium acetate, which last it is necessary to add in solution in order to prevent partial or local coagulation. All these setting agents should be used in combination with other substances, such particularly as zinc salts, for example zinc carbonate. Again, certain zinc salts, such as zinc oleate, may be used alone. The presence of zinc in the mixture is desirable, although not essential. Other bodies which act as setting agents under suitable conditions of concentration and temperature are certain salts of alkali earth metals or some acids such as acetic acid. The setting agents mentioned above, while rendering the mix unstable, do not serve to bring about complete change of phase very quickly in the cold unless they are added in greater amounts than any proposed hitherto for the production of heat-sensitive latex mixtures. With a low proportion it is, therefore, desirable to heat the resultant mixtures to bring about quick setting. On the other hand, certain other setting agents, such as a mixture of magnesium oxide, trisodium phosphate and ammonium chloride, serve to set the mixture quickly and completely in the cold.

It is important to note that the setting agent should preferably not be such as to increase the viscosity of the resultant mixture when added to the mix, because the mixture should be as fluid as possible for pouring purposes. The use of the setting agents set forth above does not instantaneously increase the viscosity of the mix but actually decreases it.

The bodies which are formed in the molds are coherent but pliable and when set can easily be lifted out of the molds and are then washed, dried and vulcanized.

In the manufacture of rubber soles or flooring open shallow molds may be used and closed molds in the manufacture of rubber balls for example, while for the manufacture of open hollow articles, such as shoes, molds with cores may be used. In the case, for example, of heels, a cover may be applied to an open mold in order to shape the heel on all sides.

In the manufacture of a molded rubber article having portions of different thickness, the mold may advantageously be subjected to differential heating, that is to say it may, at least initially, be heated to a greater extent at the thicker parts of the article than at the thinner ones. For example, in the manufacture of a shoe, a mold may be used in the form of a shell with a core and may be placed initially in a shallow layer of hot water so that the heel is immersed and is subjected to direct heating, while the upper is subjected only to heating by the steam rising from the water and by the heat transmitted by convection. If desired, such a mold may subsequently be completely or substantially completely immersed in hot water. It is not necessary to heat the core by any direct heating, and it is found that the mixture gels or sets completely satisfactorily if only the shell is heated. The shell of the mold may, of course, be made in two or more parts which can be assembled around the core. In the exercise of this feature of the invention any sensitive latex mixture may be used and the invention is not in this respect limited to the use of a mix that is rendered unstable only just before it is poured into the mold.

Small metal washers are frequently incorporated in rubber soles or heels. In the manufacture of these according to the invention, the washers may be placed on supports in open molds and then the mixture may be poured in so that the washers become embedded in the finished soles or heels.

The washing following the setting may conveniently continue for some three to four hours and is followed by drying. The drying is preferably slow at first, in order that the moisture inside the set bodies may escape and that distortion may be avoided, and the temperature may be increased slowly to about 50° C. and the total time taken may be as much as two days unless the process is accelerated by the use of an air blast or other means. The vulcanizing preferably takes place at a temperature of from 70 to 85° C. for one day.

Considerable shrinkage of the mass, owing to the loss of nearly all the water, takes place during the washing and drying and this must be allowed for, although there is no appreciable change in volume during the setting.

In the manufacture of shoes the drying and vulcanization preferably takes place on lasts to which the articles are transferred after the washing and any straps or the like can be placed in position before vulcanization and vulcanized on to the shoes.

By including in the mix an adequate quantity of sulphur, with an appropriate quantity of an activator and an accelerator if desired, and by vulcanizing the product under such conditions as are used for the vulcanization of ebonite or vulcanite, a final product having much the hardness of ebonite may be made.

A typical mix for use in the present process consists of:

The concentrated latex sold under the trademark "Revertex"_____grams__ 1300
Zinc carbonate_____do____ 150
Sulphur_____do____ 30
Zinc diethyl dithiocarbamate_____do____ 10
Water_____c. c.__ 415

This mix is rendered unstable by the addition of 230 c. c. of a 30% ammonium nitrate solution, and the resultant mixture is poured into a mold. In order to obtain the quick setting which is so desirable, the mold should be heated to, for example, 80 to 90° C. If, however, cold setting is desired, the proportion of the setting agent should be increased, for example, by taking 380 c. c. of a 71% ammonium nitrate solution.

Another example is as follows: A mix is made consisting of:

|  | Grams |
|---|---|
| Revertex | 1300 |
| Lithopone (wetted out with 300 c. c. of water) | 300 |
| Sulphur | 30 |
| Zinc diethyl dithiocarbamate | 10 |
| Magnesium oxide (wetted out with 250 grs. of 2/n trisodium phosphate) | 50 |

This mix is rendered highly unstable by adding to every 100 grs. of the mix 10 c. c. of a 10% solution of ammonium chloride. This mixture sets in the cold in a short time.

In certain cases, where a sufficiently concentrated dispersion is used, the setting agent may simply be added to the dispersion, and the expression "mix" is therefore to be read as including a highly concentrated dispersion without any other ingredients.

I claim:

1. In a process of making an article of rubber, the steps comprising mixing with concentrated, or thickened aqueous dispersion of rubber containing magnesium oxide and trisodium phosphate, ammonium chloride providing sufficient positively charged ions to cause irreversible setting of the mix without synaeresis, casting the mix to a desired form, and maintaining the mix in such form until it has set to a stable condition.

2. In a process of making an article of rubber, the steps comprising mixing with an alkaline aqueous dispersion of rubber containing a vulcanizing agent, magnesium oxide, trisodium phosphate and a zinc compound, ammonium chloride providing sufficient positively charged ions to cause irreversible setting of the mix without synaeresis, casting the mix to the desired form, maintaining the mix in such form until setting to a stable condition has taken place, washing and drying the cast article, and subsequently vulcanizing the same.

3. Process of making an article of rubber, which comprises casting to the desired form a mixture containing an alkaline aqueous dispersion of rubber, a vulcanizing agent, a zinc compound, magnesium oxide, trisodium phosphate, and ammonium chloride in an amount sufficient to cause irreversible setting without synaeresis, maintaining the shape of the mixture until such setting has occurred, washing and drying the article, and subsequently vulcanizing the same.

WALTER KAY.